United States Patent Office 3,417,000
Patented Dec. 17, 1968

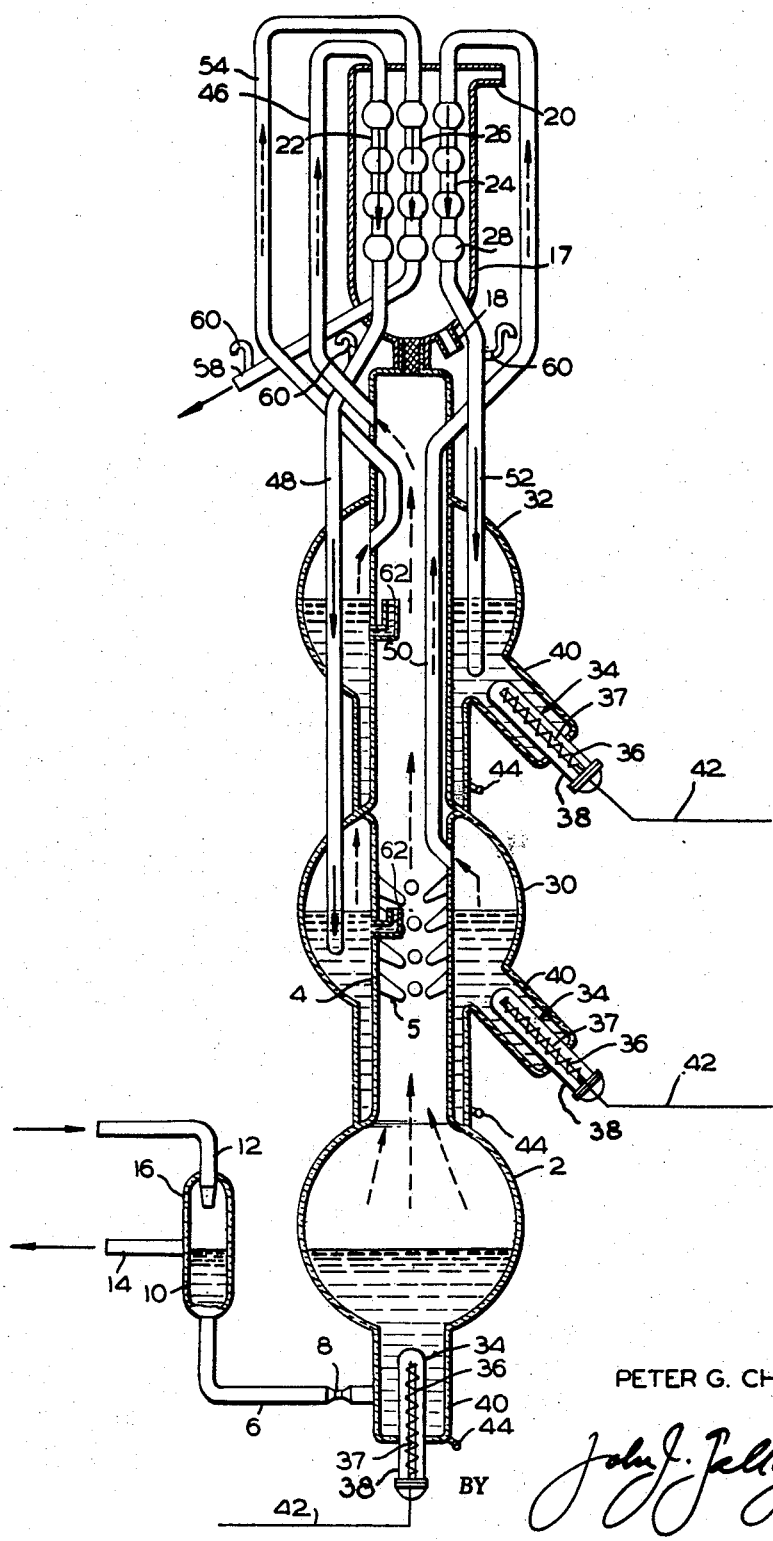

3,417,000
MULTI-STAGE STILL
Peter G. Chaconas, 4977 Battery Lane,
Bethesda, Md. 20014
Continuation-in-part of application Ser. No. 503,105,
Oct. 23, 1965. This application Nov. 13, 1967, Ser.
No. 682,052
5 Claims. (Cl. 202—174)

ABSTRACT OF THE DISCLOSURE

A distillation apparatus having a first distillation container with a column communicative therewith and a plurality of succeeding distillation containers disposed around the column in direct heat exchange relationship therewith. Each distillation container is communicative with a condenser through a conduit which is in heat exchange relationship with the column. The condensers are, in turn, communicative with the next succeeding container. The conduits communicating with the condensers are vented to the atmosphere to preclude vapor lock between the distillation containers.

---

This application is a continuation-in-part of application Ser. No. 503,105, filed Oct. 23, 1965, now abandoned.

BACKGROUND OF THE INVENTION

This invention relates to a distillation apparatus and more particularly to a multi-stage still for small volume laboratory production of distilled water and the like.

In the present art, there is an increasing requirement for an economical source of relatively small quantities of highly distilled water for use in various processes and experiments conducted in laboratories. Prior art stills have, in general, been too expensive and cumbersome to meet the particular demands of the average laboratory. The increasing need for multiple distilled products has complicated this problem in that the size and expense of a still is generally multiplied by the number of distillation stages required in the apparatus.

Although recent art bi-distillation devices have somewhat ameliorated this problem, the need for triple, quadruple and greater distillation of water is becoming more pressing, thereby negating to some degree the benefits of the bi-distillation devices.

SUMMARY OF THE DISCLOSURE

This invention provides a novel still for distillation of liquids in which the stages of distillation can be multiplied according to the needs of its particular use by furnishing a still composed of a series of similar stages which can be fabricated in any multiple required. Although the water is specified hereinafter as the distilled liquid, it should be understood that the apparatus of this invention is ideally suited for processing any chemical or chemical solution such, for example, as acetone, anhydrous alcohol or the like. Although the coolant fluid for the hereinafter described condensing structure would most generally be water, other fluids such, for example, as ethylene glycols or the like may be used for this purpose within the contemplated scope of the invention.

This invention also furnishes a multi-stage still which is suited for low volume laboratory requirements by providing an inexpensive, compact and easily operated multiple stage still.

The invention further furnishes a multiple stage still which has greater efficiency than heretofore available by providing a still apparatus in which each of the distillate paths therefore are proximate one another in close heat exchange relationship.

The invention still further provides a multi-stage still which can utilize heating units of a relatively imprecise heat producing value and which requires a minimum of attention during operation thereof by furnishing automatic feed means for the first stage distillation means and overflow and return means for the succeeding stage distillation means to return excess distillate to the first stage distillation means.

The invention further furnishes an inexpensively operated and maintained still for laboratory purposes by providing a multiple component, glass structure for the still with standard easily replaceable heating units disposed therein.

These advantages and other objects of the invention will become better understood by reference to the following detailed description when viewed in light of the accompanying drawing.

DESCRIPTION OF THE PREFERRED EMBODIMENT

Referring now to the figure, a three stage, triple distillation apparatus is shown. The first stage of the apparatus comprises a first distillation flask or container 2 having a central vapor column 4 mounted thereon. A plurality of protruding fingers 5 are disposed around the interior of the column 4 to "scrub" or reflux the vapor rising through the column and thereby return the more contaminated distillate to the first stage flask for redistillation. A water supply system comprising a supply conduit 6, having a constrcition 8 therein, conducts feed water from a reservoir 10 to the bottom of the flask 2. A water inlet 12 supplies the reservoir 10 and an overflow conduit 14, connected to the reservoir, conducts surplus water from the apparatus. A vent 16 is formed through the wall of the reservoir 10 to provide pressure equalization therein.

A condensing chamber 17 is disposed on the upper end of the column 4 and is provided with an inlet 18 and outlet 20 for circulating coolant therethrough. The chamber 17 can be connected to column 4 with a simple plug and socket joint as shown. Condensing tubes 22, 24 and 26 are disposed through the condensing chamber 17 and are provided with a plurality of expanded spherical portions 28 to furnish an increased heat transfer surface therealong.

Returning now to the first stage distillation flask 2 and the column 4, a second stage distillation flask 30 and a third stage distillation flask 32 are concentrically mounted above the first stage flask around the column 4. Obviously, additional distillation flasks could be added to or subtracted from the apparatus shown without basic modification to the working of the invention.

Each of the distillation flasks 2, 30 and 32 are provided with a heater 34 which comprises a heating coil 36 mounted on a quartz tube or holder 37. The quartz holder, in turn, is positioned inside a glass envelope 38 disposed in a cylindrical extension 40 in the distillation flask to which the heater relates. Power is supplied to the heater units from a source of electrical energy (not shown) through conductors 42. A power shut-off may be incorporated in the power supply to interrupt the supply of electrical energy to the heater units in the event the supply of water is interrupted. Such a shut-off would be actuated by sensors, disposed in the reservoir 10 and the chamber 17, for example, which would signal low level of water in either of these containers. A drain 44 is provided at the lowermost portion of each of the distillation flasks to provide means to clean deposits from the apparatus when so required, as will be described below.

A first stage condensing vapor conduit 46 connects the upper end of the column 4 to the upper end of the condensing tube 22 and a first stage distillate conduit 48 connects the lower end thereof to a lower portion of the second stage distillation flask 30. This conduit, as well as those to be described below, can be connected to their respective vapor source at several points through branch connections if desired. The conduit 48 enters the next succeeding flask below the normal liquid level thereof as is shown, to thereby provide a liquid valve between the succeeding flask, condensing vapor conduit 46, and condensing tube 22 and the vapor space in the flask 30. A second stage condensing vapor conduit 50, disposed for a portion of its length through the column 4, connects the upper portion of the second stage distillation flask 30 to the upper end of the condensing tube 24 while a second stage distillate conduit 52 provides communication between the lower end of that tube and the third stage flask 32. A third stage condensing vapor conduit 54, disposed for a portion of its length through the column 4, connects the upper portion of the third stage flask 32 to the condensing tube 26, from which the distillate is withdrawn from the apparatus through an exhaust conduit 58. Goose-neck vents 60 are disposed on the first and second stage distillate conduits 48 and 52 and on the exhaust conduit 50 to thereby furnish escape for dissolved gases and equalize pressure differentials which may occur between stages due to differing distillation rates, changes in volume during condensation or like causes, and thereby preclude resulting pressure locks in the system. The goose-neck configuration prevents the entry of dust into the system. For the geometry shown, the internal diameter of the vents 60 should preferably be on the order of five millimeters.

Overflow outlets, in the illustrated embodiment consisting of "L" shaped tubes 62 in communication with the flasks 30 and 32 through the column 4, serve to return excess distillate from those flasks to the first stage flask 2. Such excess distillate can occur as a result of heat imbalance between the heaters 34 which may cause greater production of distillate in one flask than in the succeeding flask. If overflow provisions were not made, overproduction in one flask would result in a breakdown in operation due to backup and blocking in the succeeding still flask. By permitting a latitude of variation in the heating capacity of the heaters 34, this invention also permits the use of relatively inexpensive heater units and avoids the necessity of individual controls for the units.

The overflow vents 62 also cooperate with the vents 60 to maintain a proper pressure relationship between the flasks and avoid pressure locks as was described above. Through the "L" shaped configuration of the tubes, overflow is immediately provided if the distillate level is increased over that shown in the figure while direct communication between the interior of the column 4, and the vapor space above the distillate in each flask is precluded by the column of fluid standing in the vertical portion of the tube. As was described above for the distillate conduits, this arrangement thereby provides a fluid valve between the connected components.

The location of the overflow tubes 62 in the wall of the column 4 also furnishes an easily and inexpensively fabricated overflow system for the still by utilizing the column 4 as a major portion of the return path for the overflow, thereby eliminating the requirement for additional conduiting and flask penetration which would otherwise be required for return of overflow.

In operation, and assuming that the first, second and third stage distillation flasks 2, 30 and 32 are filled with a primary, secondary and tertiary liquid consisting of undistilled, singly distilled and doubly distilled water respectively, the heaters are energized and flow is initiated through the water inlet 12. At the same time, circulation of cooling fluid through the condensing chamber 17 is begun while the liquids in the various stages are brought to a boiling temperature. A water level is established in the first stage distilling flask 2 by the level of the overflow conduit in the reservoir 10. As the level of the water in the reservoir reaches the level of the overflow conduit 14, excess water entering through the inlet conduit 12 is discharged through the overflow conduit. Since there is a hydraulic correlation between the levels of the water in the flask 2 and the reservoir 10, the water in the flask 2 will be kept at a controlled level. Since there will be a pressure build-up in the area over the water in the flask 2, while the pressure above the water in the reservoir 10 will remain substantially equal to atmospheric pressure due to communication with the bleed 16, the constriction 8 is provided in the supply conduit 6 to permit a suitable "balance" to be achieved between the columns of water in the two vessels within acceptable geometrical limits. For the geometry shown, the constriction 8 would be on the order of two millimeters in internal diameter while the diameter of the bleed 16 would be on the order of five millimeters. As the primary liquid in the first stage flask 2 reaches a boiling point, vaporization thereof is initiated and vapor rises through the column 4 into the first stage condensing vapor conduit 46 from whence it is conducted to the first stage condensing tube 22. Here the vapor is in heat exchange relationship with the cooling water in the condensing chamber 17 and is condensed to return as a liquid distillate through the first stage distillate conduit 48 to the second stage distilling flask 30 where it gathers as a secondary liquid for revaporization by the heater 34 in the second stage flask 30. The diameter of the conduit 48 and the succeeding distillate conduits is such, with respect to the condensation rate in the condensing tubes, that the distillate is transmitted along the walls of the conduit to the liquid level point at the bottom of the conduits thereby maintaining the vents 60 in communication with the entire length of the conduits and avoiding the presence of gas bubbles and the like in the conduits. The vapor from the secondary liquid passes upwardly through the second stage condensing vapor conduit 50 where it is passed in heat exchange relationship through the first stage vapor rising upwardly through the column 4 for a portion of its travel. The second stage vapor then passes through the second stage condensing tube 24, in heat exchange relationship with the cooling water circulating through the condensing chamber 17, wherein it condenses as a second stage distillate and passes through the second stage distillate conduit 52 into the third stage distillate flask for collection therein as tertiary, double distilled liquid. The heater 34 in the third stage flask brings the tertiary liquid therein to a boiling point and the vapor therefrom rises through the third stage condensing vapor conduit 54, again passing in heat exchange relationship with the first stage vapor in the column 4 for a portion of its length and into the third stage condensing tube 26 for condensation in heat exchange with the water circulating through the condensing chamber 17. The third stage distillate then is drawn off from the apparatus through the exhaust conduit 58 as triply distilled water for use as needed.

For periodic cleaning as required, acid may be passed through the system as is usual in cleaning stills of this type and, when the distillation residue is suitably dissolved, drained from the system through the drains 44 provided in each of the stages.

As will be obvious by reference to the figure, one of the more important aspects of this invention is the full utilization of heat by the continuous recycling of vapor in heat exchange relationship to other portions of the cycle. For example, the arrangement of the subsequent distillation flasks around the column 4 provides heat exchange between the fluid in those flasks and the rising first stage condensing vapor in the column, thereby utilizing the energy imparted to the still to the highest degree.

Since the first stage fluid will normally enter the system at ambient temperature, as opposed to temperatures slightly below condensing temperatures in other stages, the heat requirement of the first stage distillation process will be somewhat greater than that for the succeeding stages. The ideal temperature ratios, as well as coolant water flow rate in the condensing chamber 17, will best be determined by experimentation.

As was stated hereinbefore, it is obvious that additional stages could be added to this apparatus for extending the components thereof without requiring a change in basic configuration or operating characteristics and theory. The basic structural materials of the apparatus may be chosen as desired, however, Pyrex and quartz can be used throughout the structure for most anticipated applications.

This invention provides a simple and inexpensive multiple distillation apparatus which is adaptable for use in laboratory operations and which can furnish a continuous supply of multiply distilled water at a low cost, minimum attention and a maximum economy of space.

What has been set forth above is intended to be exemplary to enable those skilled in the art in the practice of the invention and it should therefore be understood that, within the scope of the appended claims, the invention may be practiced otherwise than as specifically described.

What is new and therefore desired to be protected by Letters Patent of the United States is:

What is claimed is:

1. A distillation apparatus comprising:
    a first distillation means including a container, a central vapor column communicative with said container;
    a plurality of succeeding distillation means formed around said column to define annular containers therewith;
    condensing means including a condensing tube corresponding to each of said containers disposed through and coextensive with said condensing means;
    a condensing vapor conduit communicating each of said condensing tubes with a corresponding annular container through said vapor column, a further condensing conduit communicating the column with its respective condensing tube, and a distillate conduit communicating each of said condensing tubes to the corresponding next succeeding container thereto, said distillate conduits terminating below a normal fluid level point in the container to provide a standing fluid level point within the distillate conduit, said distillate conduit having a vent opening therein disposed between said standing fluid level point and said condensing tube;
    overflow means disposed in each annular container exhausting to said vapor column; and
    a condensate exhaust means communicating with the last of said condensing tubes.

2. A distillation apparatus in accordance with claim 1 further comprising a fluid feed means for maintaining a constant fluid level in said first distillation means.

3. A distillation apparatus in accordance with claim 2 wherein said distillation means includes heating means associated with each of said containers.

4. A distillation apparatus in accordance with claim 3 wherein said condensing means includes a chamber enclosing said condensing tubes and means to circulate condensing fluid through said chamber.

5. A distillation apparatus in accordance with claim 4 wherein said overflow means comprises an overflow conduit disposed to communicate each of said annular containers with said vapor column, said conduit communicating with said container at a point below the normal fluid level point therein and terminating in said vapor column at a point substantially coincident with the normal fluid level point.

References Cited

UNITED STATES PATENTS

| 3,256 | 9/1843 | Heard | 202—173 |
| 2,822,323 | 2/1958 | Zellner et al. | 202—174 |
| 2,837,469 | 6/1958 | Mohn | 202—174 XR |

FOREIGN PATENTS

| 2,031 | 6/1873 | Britain. |
| 496,968 | 8/1954 | Italy. |

NORMAN YUDKOFF, *Primary Examiner.*
D. EDWARDS, *Assistant Examiner.*

U.S. Cl. X.R.

202—158, 181, 197, 202